US011362966B2

(12) United States Patent
Goh et al.

(10) Patent No.: US 11,362,966 B2
(45) Date of Patent: Jun. 14, 2022

(54) METHOD OF ETHERNET AUTO-NEGOTIATION OVER ONE CABLE

(71) Applicant: Intel Corporation, Santa Clara, CA (US)

(72) Inventors: Chee-kiang Goh, Singapore (SG); Mario Traeber, Singapore (SG)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/748,160

(22) Filed: Jan. 21, 2020

(65) Prior Publication Data

US 2020/0162406 A1 May 21, 2020

Related U.S. Application Data

(60) Provisional application No. 62/798,932, filed on Jan. 30, 2019.

(51) Int. Cl.
*H04L 49/00* (2022.01)
*H04L 45/00* (2022.01)
(Continued)

(52) U.S. Cl.
CPC .......... *H04L 49/3054* (2013.01); *H01B 11/02* (2013.01); *H04L 45/66* (2013.01);
(Continued)

(58) Field of Classification Search
CPC ..... H04L 49/3054; H04L 45/66; H04L 47/24; H04L 47/28; H04L 47/12; H01B 11/02
See application file for complete search history.

(56) References Cited

U.S. PATENT DOCUMENTS 6,175,865 B1 * 1/2001 Dove ............... G06F 13/4072
709/220
6,457,055 B1 * 9/2002 Hwong ............. H04L 12/40136
370/242

(Continued)

OTHER PUBLICATIONS

IEEE Standard for Information technology—Telecommunications and information exchange between systems—Part 3: Carrier sense multiple access with Collision Detection (CSMA/CD) Access Method and Physical Layer Specifications. IEEE Std 802.3™-2008.Dec. 26, 2008. (Year: 2008).*

(Continued)

*Primary Examiner* — Hassan A Phillips
*Assistant Examiner* — Mohammed S Chowdhury
(74) *Attorney, Agent, or Firm* — Compass IP Law PC

(57) ABSTRACT

Examples include a method of identifying single twisted pair cable Ethernet auto-negotiation requests or double twisted pair cables Ethernet auto-negotiation requests using detection of message time interval patterns. The method includes receiving, by a first Ethernet device, a plurality of messages transmitted by a second Ethernet device over a single twisted pair cable connecting the first Ethernet device and the second Ethernet device; storing one or more time intervals between starting times of successive pairs of the plurality of messages; determining if a pattern is found in the time intervals; when the pattern is found, setting a single twisted pair cable communications mode between the first Ethernet device and the second Ethernet device; and performing priority resolution between the first Ethernet device and the second Ethernet device.

15 Claims, 6 Drawing Sheets

(51) Int. Cl.
  *H04L 47/24* (2022.01)
  *H04L 47/28* (2022.01)
  *H01B 11/02* (2006.01)
  *H04L 47/12* (2022.01)

(52) U.S. Cl.
  CPC .............. *H04L 47/12* (2013.01); *H04L 47/24* (2013.01); *H04L 47/28* (2013.01)

(56) References Cited

U.S. PATENT DOCUMENTS

| | | | |
|---|---|---|---|
| 9,887,880 B1* | 2/2018 | Lo ....................... | H04L 41/0866 |
| 2003/0161348 A1* | 8/2003 | Mills ....................... | H04L 12/12 |
| | | | 370/509 |
| 2003/0165142 A1* | 9/2003 | Mills ....................... | H04L 12/12 |
| | | | 370/395.62 |
| 2003/0165152 A1* | 9/2003 | Mills ....................... | H04L 12/12 |
| | | | 370/422 |
| 2003/0179816 A1* | 9/2003 | Huff ....................... | H04L 12/10 |
| | | | 375/219 |
| 2012/0275527 A1* | 11/2012 | Douglass ............. | H04L 25/0272 |
| | | | 375/257 |
| 2016/0352535 A1* | 12/2016 | Hiscock .............. | H04L 49/3054 |
| 2019/0253968 A1* | 8/2019 | Xiao .................. | H04W 28/0205 |
| 2019/0385057 A1* | 12/2019 | Litichever ................ | G06N 3/08 |

OTHER PUBLICATIONS

IEEE Standard for Ethernet; Amendment 4: Physical Layer Specifications and Management Parameters for 1 Gb/s Operation over a Single Twisted-Pair Copper Cable. IEEE Std 802.3bp™-2016. (Year: 2016).*

Auto-Negotiation White Paper, "Auto-Negotiation Problem with National DP83840A and HP 100Base-T adapters", Hewlett-Packard Company, Nov. 2000, 12 pages.

Broadcom Corporation, "OPEN Alliance BroadR-Reach (OABR) Physical Layer Transceiver Specification for Automotive Applications", v3.2, Jun. 2014, 88 pages.

Dr. Ali Abaye, "BroadR-erach Technology: Enabling One Pair Ethernet", Broadcom Corporation, 2012, 28 pages.

* cited by examiner

METHOD OF ETHERNET AUTO-NEGOTIATION OVER ONE CABLE

CROSS-REFERENCE TO RELATED APPLICATION

This application claims the benefit of U.S. Provisional Application No. 62/798,932, filed Jan. 30, 2019.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2019, Intel Corporation, All Rights Reserved.

TECHNICAL FIELD

Examples described herein are generally related to Ethernet networking communications and more particularly to auto-negotiation.

BACKGROUND

Auto-negotiation is a signaling mechanism and procedure used by Ethernet (first standardized in 1983 as Institute of Electrical and Electronics Engineers (IEEE) 802.3) over twisted pair cables by which two connected devices choose common transmission parameters, such as speed, duplex mode, and flow control. Ethernet over twisted pair technologies use two twisted pair cables for the physical layer of an Ethernet computer network. They are a subset of all Ethernet physical layers. In this process, the connected devices first share their capabilities regarding these parameters and then choose the highest performance transmission mode they both support. Auto-negotiation is defined in Clause 28: "Physical Layer Link Signaling for Auto-Negotiation on Twisted Pair" of the IEEE 802.3 standard defining the physical layer and data link layer's media access control (MAC) of wired Ethernet.

DETAILED DESCRIPTION

Embodiments of the present invention include a method to enable an auto-negotiation process between two Ethernet devices over only one twisted pair cable, while remaining interoperable with existing Ethernet products typically using two twisted pair cables. This allows existing Ethernet physical layer products to be used standalone or as Internet Protocol (IP) processing components within home gateway products (or other products and devices) to support one twisted pair cable Ethernet, with only a firmware upgrade.

Figure 1:
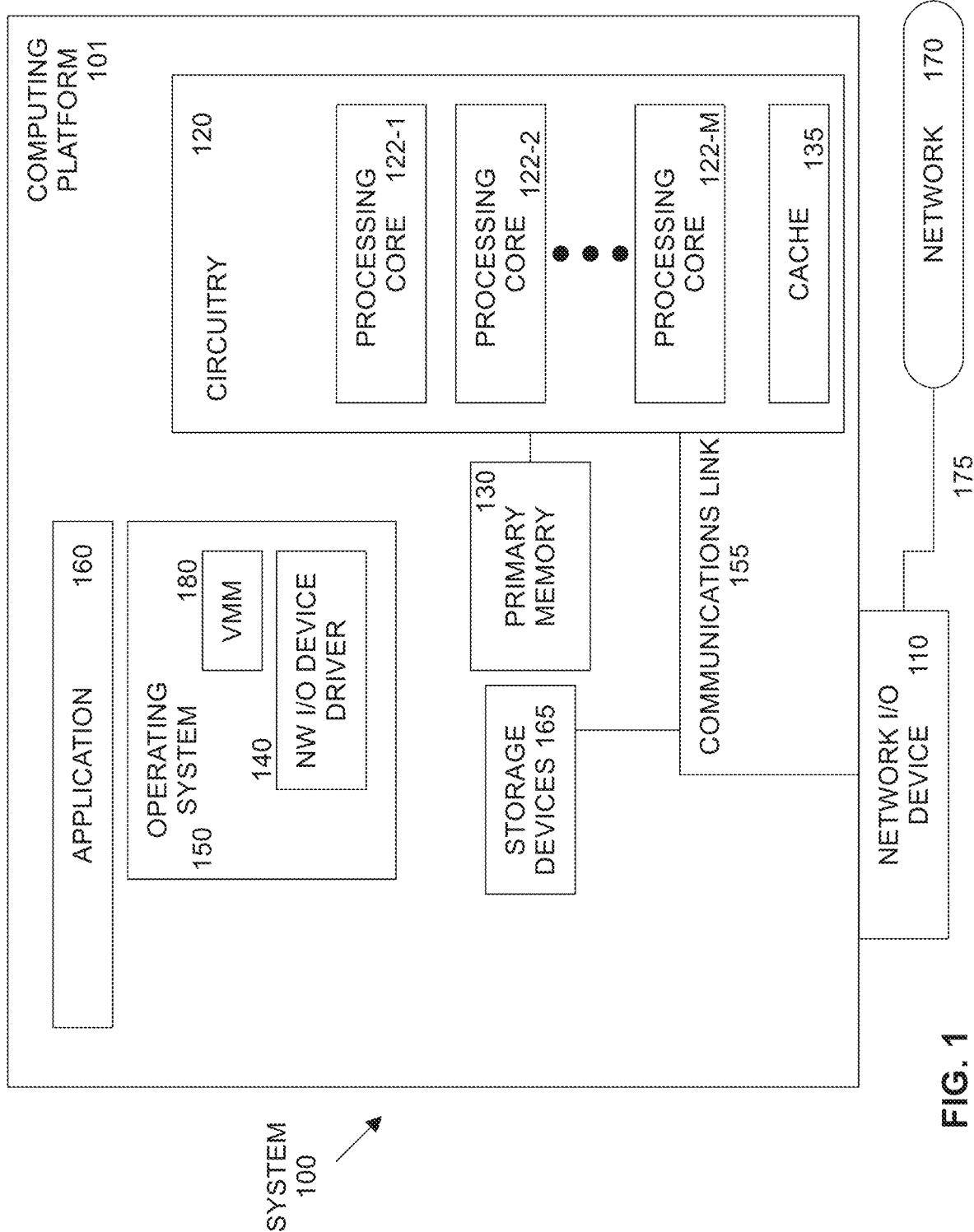
FIG. 1 illustrates an example computing system.

FIG. 1 illustrates an example computing system 100. As shown in FIG. 1, computing system 100 includes a computing platform 101 coupled to a network 170 (which may be the Internet, for example, or a network within a data center). In some examples, as shown in FIG. 1, computing platform 101 is coupled to network 170 via network communication channel 175 and through at least one network I/O device 110 (e.g., a network interface controller (NIC)) having one or more ports connected or coupled to network communication channel 175. In an embodiment, network I/O device 110 is an Ethernet NIC and network 170 and/or network I/O device 110 supports any variation of Ethernet over either one twisted pair cable or two twisted pair cables. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, network (NW) I/O device driver 140, operating system (OS) 150, virtual machine manager (VMM) 180 (also known as a hypervisor), at least one application 160, and one or more storage devices 165. In one embodiment, OS 150 is Linux™. In another embodiment, OS 150 is Windows® Server. In an embodiment, application 160 represents one or more application programs executed by circuitry 120. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a Peripheral Component Interface Express (PCIe) bus conforming to revision 4.0 or other versions of the PCIe standard. In other embodiments, other communications interfaces may be used. In some examples, operating system 150, NW I/O device driver 140, application 160, VMM 180, are implemented, at least in part, via cooperation between one or more memory devices included in primary memory 130 (e.g., volatile or non-volatile memory devices), storage devices 165, and elements of circuitry 120 such as processing cores 122-1 to **122-*m*, where "m" is any positive whole integer greater than 2. In an embodiment, a single core processor is used. In an embodiment, OS 150, NW I/O device driver 140, VMM 180, application 160, and are executed by one or more processing cores 122-1 to 122-*m*. In other embodiments, there are other endpoint devices coupled to communications link 155** (e.g., PCIe interconnect).

In some examples, computing platform 101, includes but is not limited to a computer server, a high-performance computing server (HPC) server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, automotive computing systems, industrial computing systems, or a combination thereof. In one example, computing platform 101 is a disaggregated server. A disaggregated server is a server that breaks up components and resources into subsystems. Disaggregated servers can be adapted to changing storage or compute loads as needed without replacing or disrupting an entire server for an extended period of time. A server could, for example, be broken into modular compute, I/O, power and storage modules that can be shared among other nearby servers. In some embodiments, the computing platform is part of an automotive vehicle, such as a passenger car, truck, van, and so on, where one computing platform communicating over Ethernet implements an infotainment system, for example, and another computing platform implements an autonomous vehicle (AV) control system, for example. Other components within a vehicle that communicate over Ethernet may also incorporate embodiments of the present invention. In an embodiment, the computing platform may further assemble messages for forwarding to a data center over a network for the control of autonomous vehicles making driving safer and/or more efficient.

Circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, processors from Advanced Micro Devices (AMD) Corporation, and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

Embodiments of the present invention use time intervals between negotiation messages (as measured by digital clocks or timers) to indicate a request for auto-negotiation over a single twisted pair cable. In an embodiment, the single twisted pair cable is represented as link 175 of FIG. 1, network I/O device 110 is representative of one end of the communication link, and another computing device (not shown in FIG. 1) is coupled to the other end of the communication link. Responses to the messages use the same patterned time intervals to avoid message collision. Receivers adjust transmission times of messages such that the messages from either device of the pair of devices are never sent at the same time. In embodiments, time intervals are selected within standard defined limits so that the cable can also be interoperable with normal Ethernet devices designed for using two cables. A pattern of at least two unique intervals can be extended to encompass more complex patterns so long as the cable can be uniquely identifiable.

Embodiments of the present invention provide advantages over the existing two twisted pair cable solutions. Embodiments identify one twisted pair cable auto-negotiation requests or normal two twisted pair cable auto-negotiation requests through patterned time interval detection processing, seamlessly work with existing Ethernet devices supporting any version of an Ethernet standard and new one twisted pair cable Ethernet devices, and base page messages and extended/normal next page messages can be exchanged as per standard definitions. Further advantages include working with one twisted pair cable or full category 3 (CAT3) and above cables and implementing a single silicon solution possible for multi-Ethernet-physical layer capability support. Embodiments of the present invention require no new hardware. Furthermore, existing Ethernet physical layer products can be enhanced by updated firmware to achieve this new capability. Once auto-negotiation is complete, operation using eight wires (four pair) as defined by any version of the Ethernet standard may be performed.

Figure 2:
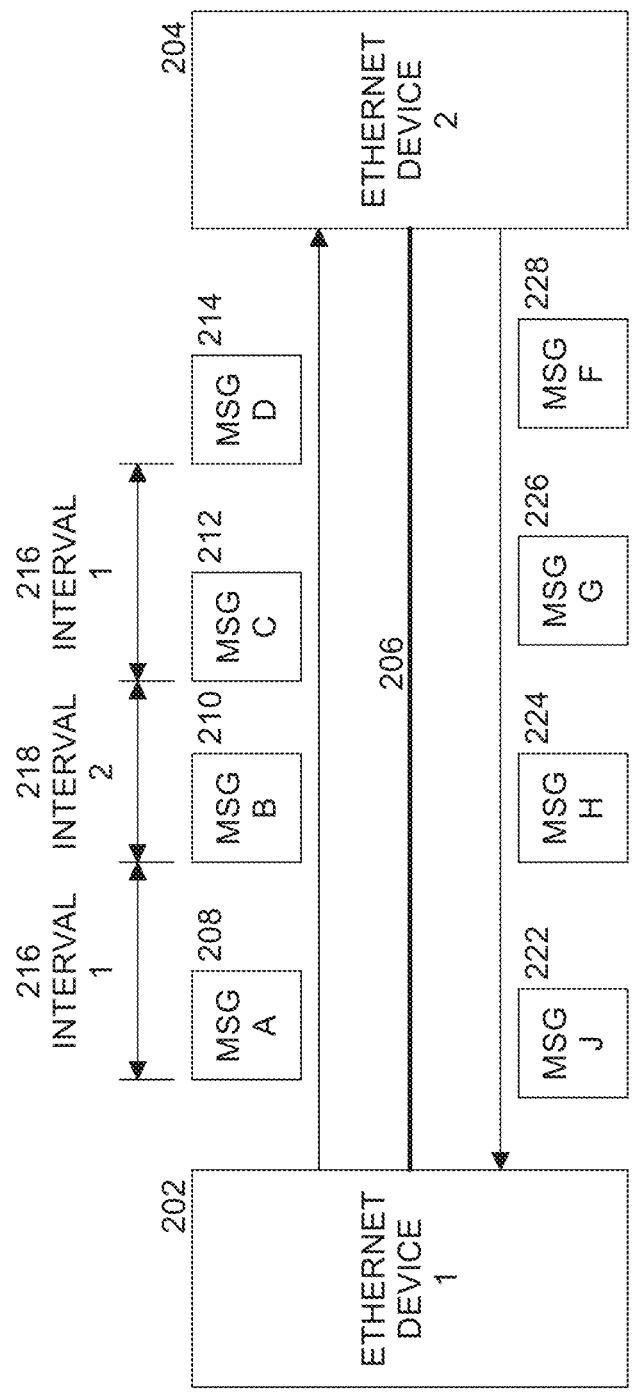
FIG. 2 illustrates time intervals and messages for auto-negotiation in an embodiment.

FIG. 2 illustrates time intervals and messages for auto-negotiation in an embodiment. A first Ethernet device 1 202 is coupled to a second Ethernet device 2 204 over a single twisted pair cable 206. Ethernet device 1 202 sends a plurality of messages MSG A 208, MSG B 210, MSG C 212, MSG D 214 to Ethernet Device 2 204 over cable 206. In this simple example, the time from the start of sending MSG A 208 to the start of sending MSG B 210 is interval 1 216. The time from the start of sending MSG B 210 to the start of sending MSG C 212 is interval 2. In an embodiment, interval 1 216 is different than interval 2 218. The time from the start of sending MSG C 212 to the start of sending MSG D 214 is again interval 1 216. Thus, the intervals between sending messages can be interpreted as a message pattern. For example, in this case the message pattern is interval 1, interval 2, interval 1, and so on. In embodiments, receipt of the message pattern by Ethernet device 2 204 is used to indicate a request for auto-negotiation by Ethernet device 1 202 over single twisted pair cable 206. Ethernet device 2 204 identifies the message pattern based on the time intervals and responds with messages MSG F 228, MSG G 226, MSG H 224, and MSG J 222 sent with the same pattern of time intervals. In an embodiment, Ethernet device 1 202 selects intervals with limits defined by the Ethernet 802.3 standard in or to be interoperable with normal Ethernet products.

Figure 3:
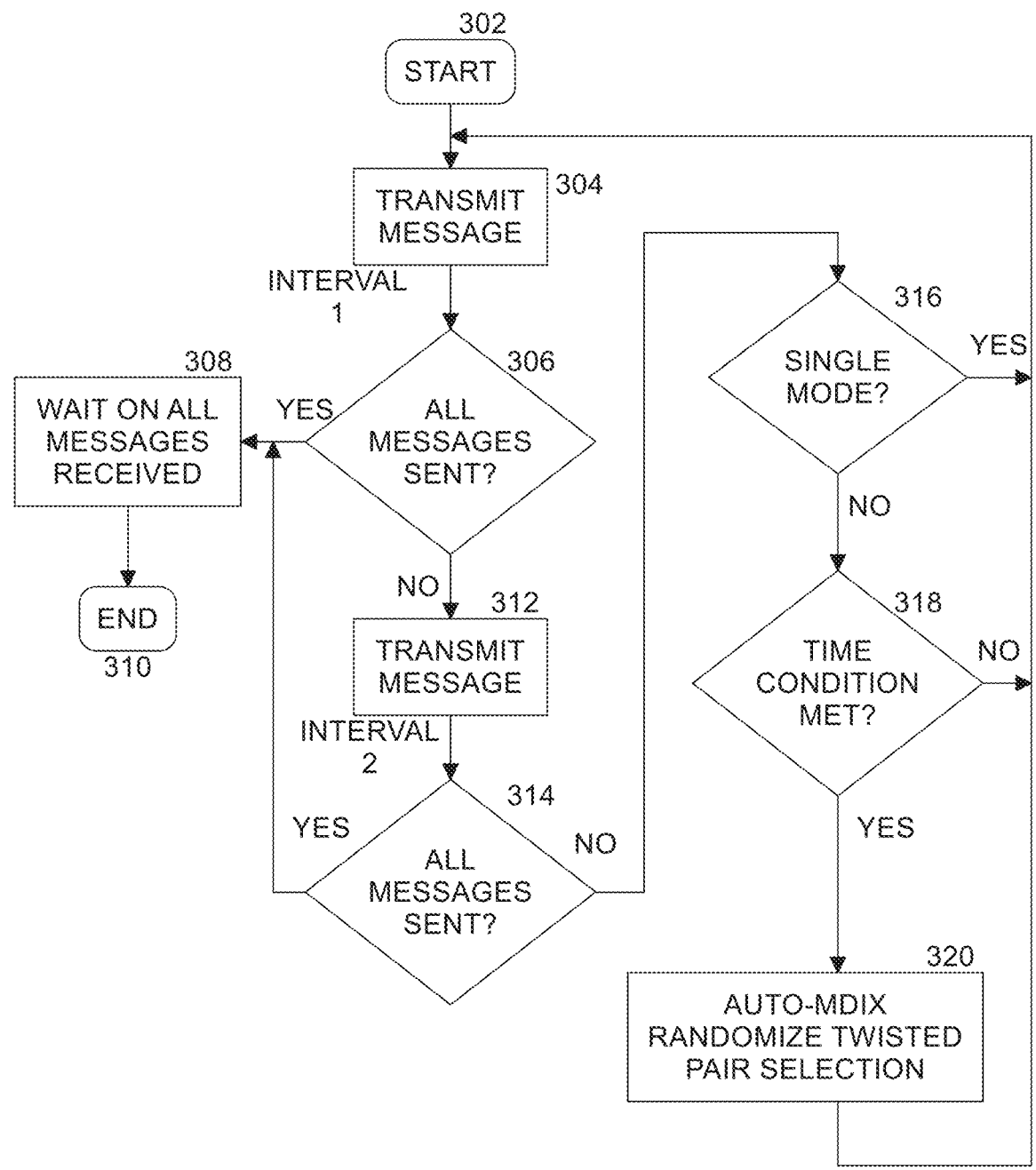
FIG. 3 is a flow diagram of transmit processing according to an embodiment.

FIG. 3 is a flow diagram 300 of transmit processing according to an embodiment. Transmit processing is performed independently by each of the Ethernet devices 1 202 and 2 204. After start block 302, first Ethernet device 1 202 transmits a message (e.g., MSG A 208) to a second Ethernet device 2 204 over a communications link and waits for a first time period. This starts time interval 1 216 as shown in FIG. 2. At block 306, if all messages have been sent as part of the auto-negotiation process, then Ethernet device 1 202 waits on notification of all messages being received by Ethernet device 2 204 at block 308. Processing ends at end block 310. If at block 306 all messages have not been sent as part of the auto-negotiation process, then Ethernet device 1 202 transmits another message at block 312 and waits for a second time period. For example, this starts time interval 2 218 as shown in FIG. 2. At block 314, if all messages have been sent, then processing continues with block 308 to wait on all messages being received. If all messages have not been sent (e.g., the auto-negotiation process is ongoing), Ethernet device 1 202 checks if a single twisted pair cable communications mode has been set at block 316. In an embodiment, the single twisted pair cable communications model is a flag or bit in each Ethernet device. If so, processing continues with transmitting another message at block 304. If not, a normal two twisted pair cable is being used between the Ethernet devices (e.g., the pre-existing case) so processing continues with block 318. If a predetermined time condition is met at block 318, then processing continues with block 320. At block 320, an automatic medium-dependent interface crossover (auto-MDIX) randomize twisted pair selection is performed. When auto-MDIX is enabled on an interface, the interface automatically detects the required cable connection type (straight through or crossover) and configures the connection appropriately. Processing then continues with block 304. If at block 318 the predetermined time condition is not met, then processing continues with transmission of another message at block 304. In an embodiment, the predetermined time condition is 65 milliseconds.

Figure 4:
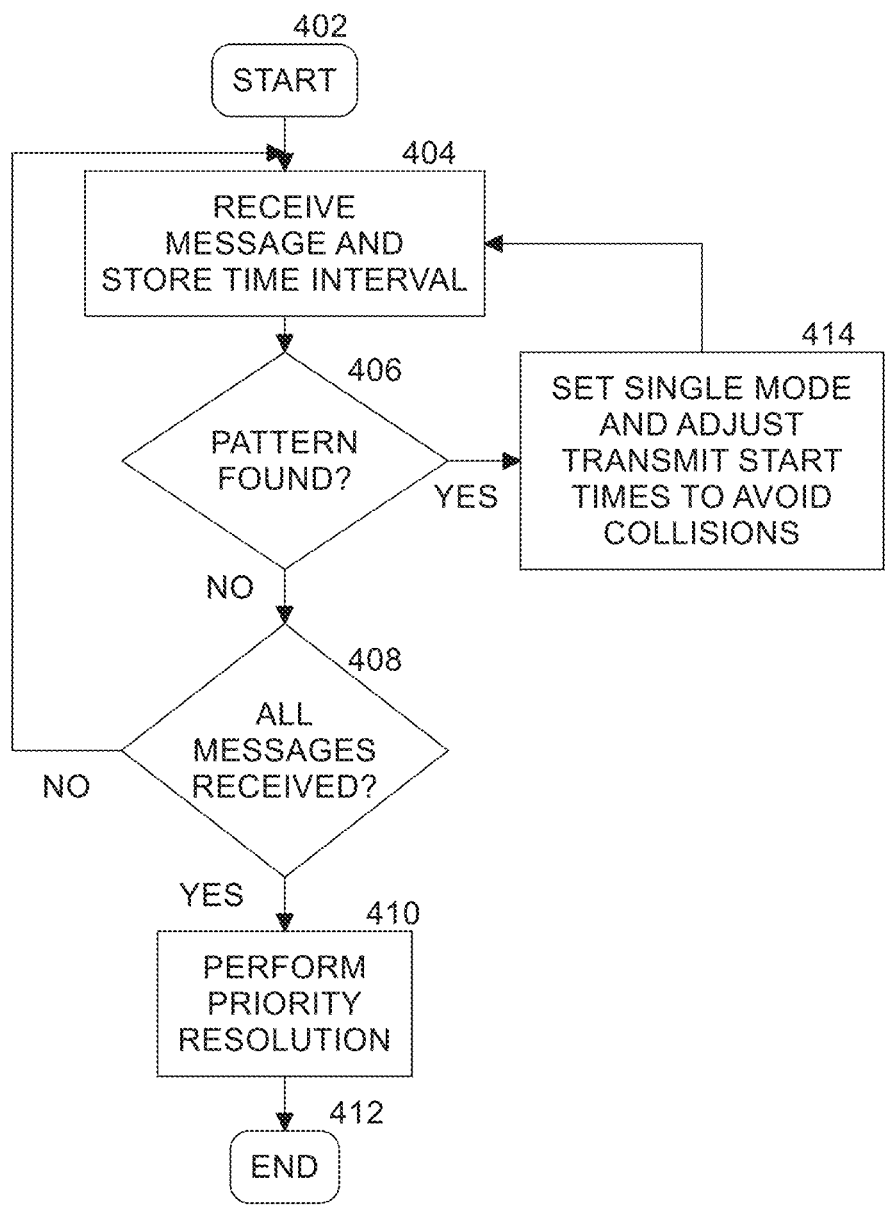
FIG. 4 is a flow diagram of receive processing according to an embodiment.

FIG. 4 is a flow diagram 400 of receive processing according to an embodiment. Receive processing is performed independently by each of the Ethernet devices 1 202 and 2 204. After start block 402, Ethernet device 2 204 receives a message from Ethernet device 1 202 at block 404. In an embodiment, Ethernet device 2 204 detects and stores the time intervals between received messages. That is, Ethernet device 2 204 stores the time intervals between starting times of reception of successive pairs of messages received from Ethernet device 1 202. Next, at block 406, if a pattern in the time intervals of receiving messages is found by Ethernet device 2 204 then Ethernet device 2 204 at block 414 sets the single twisted-pair communications mode for communications between the two Ethernet devices and adjusts the start times of transmitting messages back to Ethernet device 1 202 based at least in part on the detected pattern to avoid collisions. In an embodiment, the start times may be adjusted either forward or backward. If no pattern is yet found, then processing continues with block 408. At block 408, Ethernet device 2 204 determines if all messages have been received for this auto-negotiation process from Ethernet device 1 202. If not, processing continues with receiving another message at block 404. If all messages have been received by Ethernet device 2 204, then processing moves to block 410, where priority resolution is performed between the two devices (as described, for example, in the IEEE 802.3 standard at clause 28.2.3.3). Processing ends at end block 412.

Figure 5:
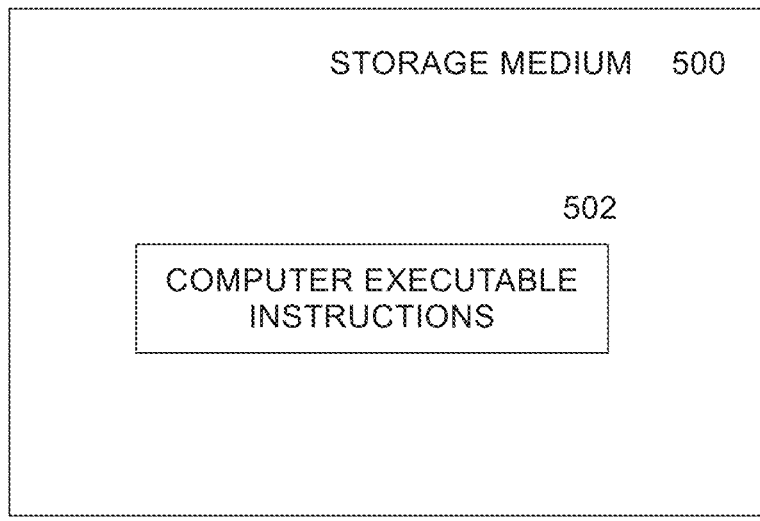
FIG. 5 illustrates an example of a storage medium.

FIG. 5 illustrates an example of a storage medium 500. Storage medium 500 may comprise an article of manufacture. In some examples, storage medium 500 may include any tangible non-transitory computer readable medium or machine readable medium, such as an optical, magnetic or semiconductor storage. Storage medium 500 may store various types of computer executable instructions, such as instructions 502 to implement logic flows described above in FIGS. 3 and 4. Examples of a computer readable or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions include any suitable type of code, such as source code, compiled code, interpreted code, executable code, static code, dynamic code, object-oriented code, visual code, and the like. The examples are not limited in this context.

Figure 6:
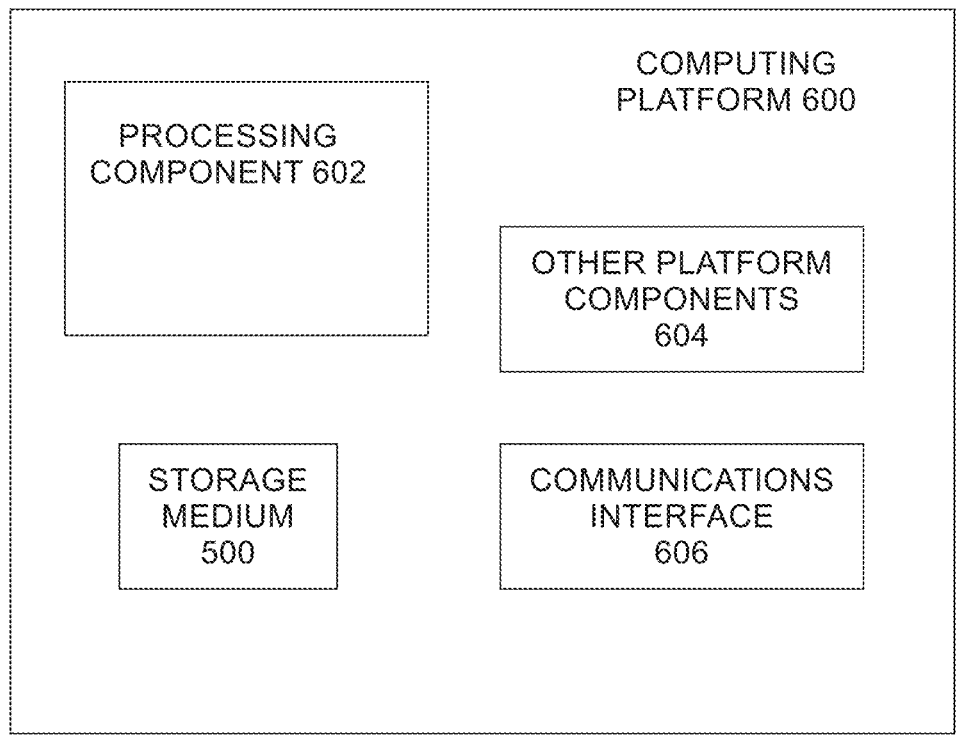
FIG. 6 illustrates another example computing platform.

FIG. 6 illustrates an example computing platform 600. In some examples, as shown in FIG. 6, computing platform 600 may include a processing component 602 (e.g., a processor), other platform components 604 and/or a communications interface 606. In an embodiment, one or more parts of computing platform 600 are included in Ethernet device 1 202, Ethernet device 2 204, or both.

According to some examples, processing component 602 may execute processing operations or logic for instructions stored on storage medium 500. Processing component 602 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 604 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 606 may include logic and/or features to support a communication interface. For these examples, communications interface 606 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 600, including logic represented by the instructions stored on storage medium 600 may be implemented using any combination of discrete circuitry, ASICs, logic gates and/or single chip architectures. Further, the features of computing platform 600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 600 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A method of auto-negotiation comprising:
receiving, by a first Ethernet device, a plurality of messages transmitted by a second Ethernet device over a single twisted pair cable connecting the first Ethernet device and the second Ethernet device;
storing, by the first Ethernet device, one or more time intervals between receive times of successive pairs of the plurality of messages;
determining, by the first Ethernet device, if a pattern is found in the one or more time intervals between receive times of successive pairs of the plurality of messages; and
based on the pattern of receive times of successive pairs of the plurality of messages being identified, setting, by the first Ethernet device, a single twisted pair cable communications mode of start times of signal transmissions from the first Ethernet device to the second Ethernet device; and
transmitting a second plurality of messages from the first Ethernet device to the second Ethernet device over the single twisted pair cable according to the identified pattern between receive times of successive pairs of the plurality of messages.

2. The method of claim 1, comprising:
adjusting start times of transmitting messages from the first Ethernet device to the second Ethernet device over the single twisted pair cable to avoid collisions of messages.

3. The method of claim 2, comprising:
based on the single twisted pair cable communications mode not being set, and based on a time condition being met, performing automatic medium-dependent interface crossover (auto-MDIX) randomize twisted pair selection.

4. The method of claim 2, comprising:
waiting a first time period after transmitting a first one of the second plurality of messages from the first Ethernet device to the second Ethernet device over the single twisted pair cable; and
waiting a second time period after transmitting a second one of the second plurality of messages from the first Ethernet device to the second Ethernet device over the single twisted pair cable.

5. The method of claim 1, comprising:
performing priority resolution between the first Ethernet device and the second Ethernet device by the first Ethernet device, wherein priority resolution is based on IEEE 802.3 standard at clause 28.

6. A tangible non-transitory machine-readable medium comprising a plurality of instructions that in response to being executed by at least one processor of a processing system cause the at least one processor of the processing system to:
receive, by a first Ethernet device, a plurality of messages transmitted by a second Ethernet device over a single twisted pair cable connecting the first Ethernet device and the second Ethernet device;
store, by the first Ethernet device, one or more time intervals between receive times of successive pairs of the plurality of messages;
determine, by the first Ethernet device, if a pattern is found in the one or more time intervals between receive times of successive pairs of the plurality of messages; and
based on the pattern of receive times of successive pairs of the plurality of messages being identified, set, by the first Ethernet device, a single twisted pair cable communications mode of start times of signal transmissions from the first Ethernet device to the second Ethernet device; and
transmit a second plurality of messages from the first Ethernet device to the second Ethernet device over the single twisted pair cable according to the identified pattern between receive times of successive pairs of the plurality of messages.

7. The tangible non-transitory machine-readable medium of claim 6, comprising instructions that in response to being executed by the at least one processor of the processing system cause the at least one processor of the processing system to:
adjust start times of transmitting messages from the first Ethernet device to the second Ethernet device over the single twisted pair cable to avoid collisions of messages.

8. The tangible non-transitory machine-readable medium of claim 7, comprising instructions that in response to being executed by the at least one processor of the processing system cause the at least one processor of the processing system to:
when the single twisted pair cable communications mode is not set, if a time condition is met, perform automatic medium-dependent interface crossover (auto-MDIX) randomize twisted pair selection.

9. The tangible non-transitory machine-readable medium of claim 7, comprising instructions that in response to being executed by the at least one processor of the processing system cause the at least one processor of the processing system to:
wait a first time period after transmitting a first one of the second plurality of messages transmitted from the first Ethernet device to the second Ethernet device over the single twisted pair cable; and
wait a second time period after transmitting a second one of the second plurality of messages transmitted from the first Ethernet device to the second Ethernet device over the single twisted pair cable.

10. The tangible non-transitory machine-readable medium of claim 6, comprising instructions that in response to being executed by the at least one processor of the processing system cause the processing system to:
perform priority resolution between the first Ethernet device and the second Ethernet device by the first Ethernet device, wherein priority resolution is based on IEEE 802.3 standard at clause 28.

11. An apparatus comprising:
circuitry to:
receive, by a first Ethernet device, a plurality of messages transmitted by a second Ethernet device over a single twisted pair cable connecting the first Ethernet device and the second Ethernet device;
store, by the first Ethernet device, one or more time intervals between receive times of successive pairs of the plurality of messages;
determine, by the first Ethernet device, if a pattern is found in the time intervals between receive times of successive pairs of the plurality of messages; and based on the pattern of receive times of successive pairs of the plurality of messages being identified, set, by the first Ethernet device, a single twisted pair cable communications mode of start times of signal transmissions from the first Ethernet device to the second Ethernet device; and transmit a second plurality of messages from the first Ethernet device to the second Ethernet device over the single twisted pair cable according to the identified pattern between receive times of successive pairs of the plurality of messages.

12. The apparatus of claim 11, wherein the circuitry is to: adjust start times of transmitting messages from the first Ethernet device to the second Ethernet device over the single twisted pair cable to avoid collisions of messages.

13. The apparatus of claim 12, wherein the circuitry is to: when the single twisted pair cable communications mode is not set, if a time condition is met, perform automatic medium-dependent interface crossover (auto-MDIX) randomize twisted pair selection.

14. The apparatus of claim 12, wherein the circuitry is to:

wait a first time period after transmitting a first one of the second plurality of messages transmitted from the first Ethernet device to the second Ethernet device over the single twisted pair cable and wait a second time period after transmitting a second one of the second plurality of messages transmitted from the first Ethernet device to the second Ethernet device over the single twisted pair cable.

15. The apparatus of claim 11, wherein the circuitry is to:

perform priority resolution between the first Ethernet device and the second Ethernet device by the first Ethernet device, wherein priority resolution is based on IEEE 802.3 standard at clause 28.

\* \* \* \* \*